F. L. SESSIONS.
APPARATUS FOR ELECTRIC WELDING.
APPLICATION FILED MAY 5, 1919.
Reissued July 27, 1920.
14,927.
2 SHEETS—SHEET 1.
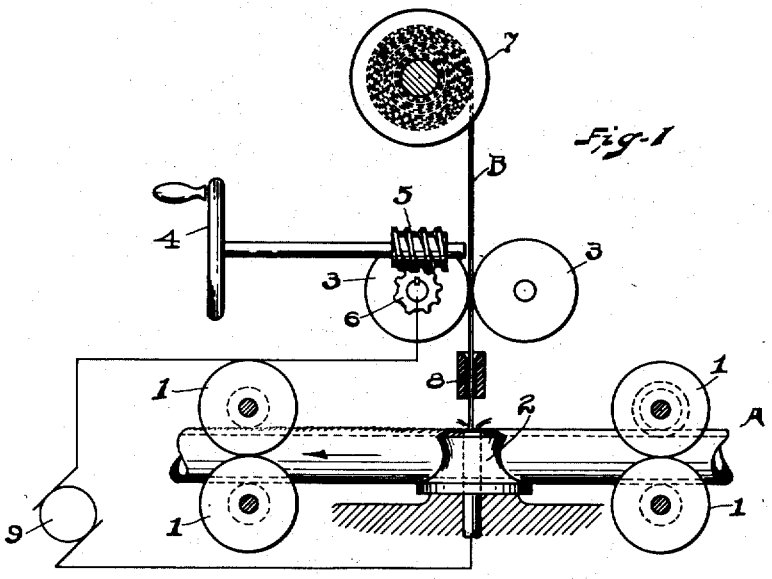
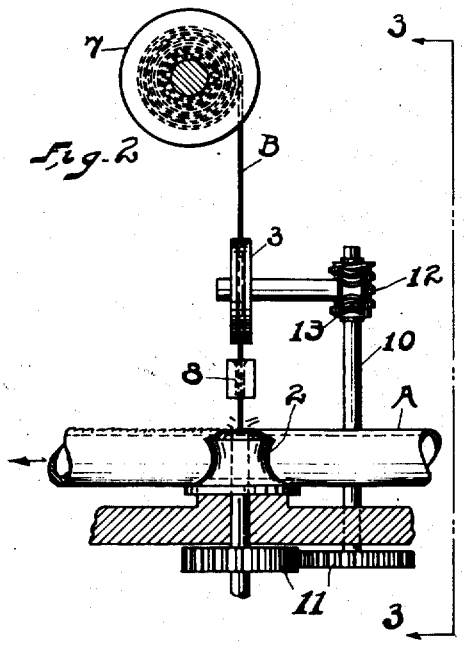
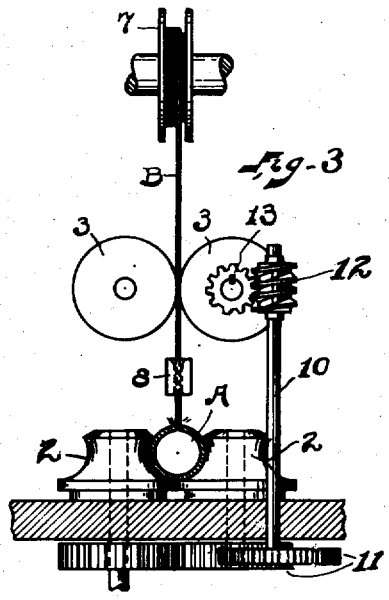
Inventor
Frank L. Sessions
By
Attorney F. L. SESSIONS.
APPARATUS FOR ELECTRIC WELDING.
APPLICATION FILED MAY 5, 1919.
Reissued July 27, 1920.
14,927.
2 SHEETS—SHEET 2.
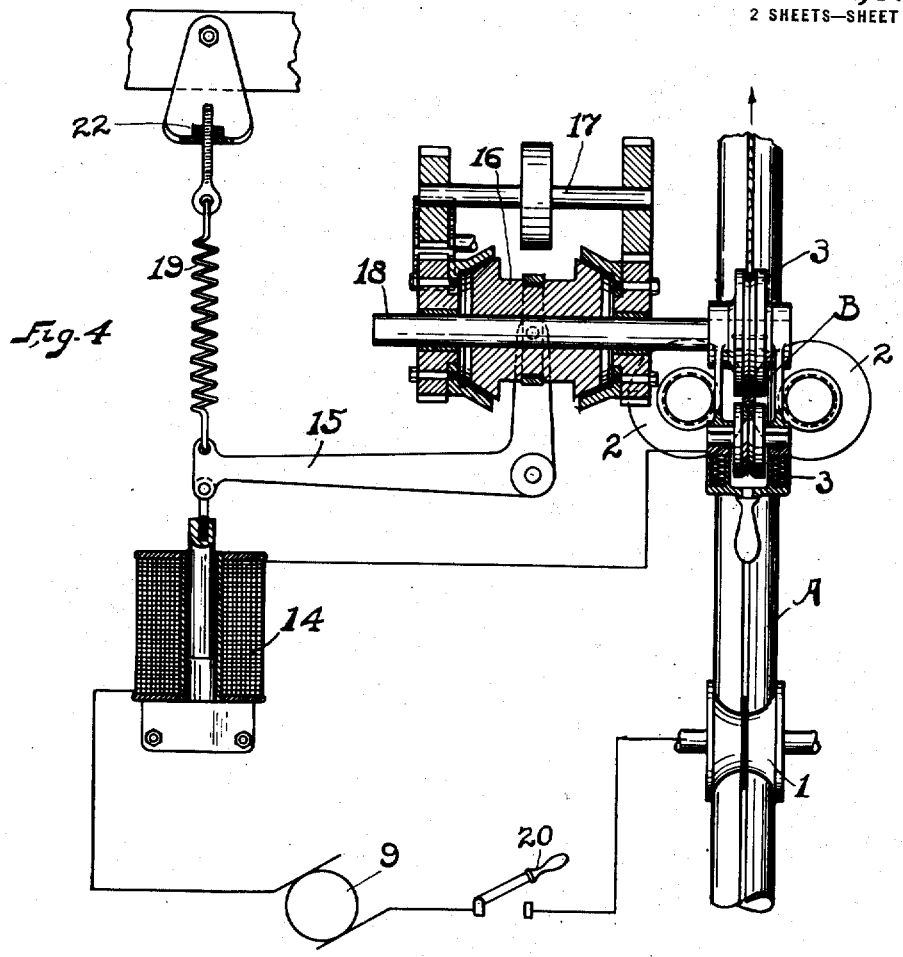
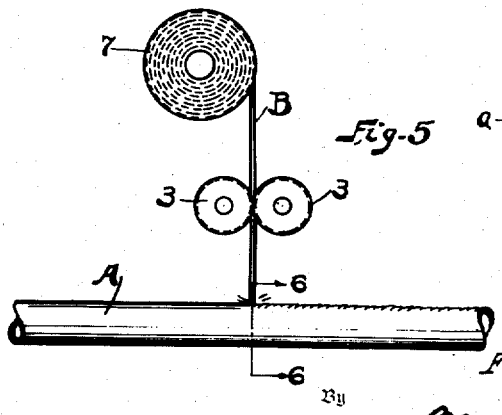
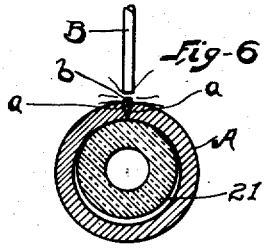
Inventor
Frank L. Sessions
By
Attorney

UNITED STATES PATENT OFFICE.

FRANK L. SESSIONS, OF LAKEWOOD, OHIO, ASSIGNOR, BY MESNE ASSIGNMENTS, TO THE STANDARD PARTS COMPANY, OF CLEVELAND, OHIO, A CORPORATION OF OHIO.

APPARATUS FOR ELECTRIC WELDING.

14,927. Specification of Reissued Letters Patent. Reissued July 27, 1920.

Original No. 1,287,774, dated December 17, 1918, Serial No. 779,674, filed July 18, 1913. Renewed April 26, 1918, Serial No. 231,025. Application for reissue filed May 5, 1919. Serial No. 295,010.

*To all whom it may concern:*

Be it known that I, FRANK L. SESSIONS, a citizen of the United States, and a resident of Lakewood, county of Cuyahoga, and State of Ohio, have invented a new and useful Improvement in Apparatus for Electric Welding, of which the following is a specification, the principle of the invention being herein explained and the best mode in which I have contemplated applying that principle, so as to distinguish it from other inventions.

The present invention relates more particularly to the welding together of the juxtaposed edges of two sheets of metal, or the abutting edges of one sheet bent into tubular form, by using a metallic electrode which is fused as the welding operation progresses, the fused material of said electrode being incorporated in the weld. The object of the invention is to provide a method of procedure and apparatus for use therein, whereby such an electrode having an indefinite length may be fed continuously, and, if desired, automatically, at the proper rate of speed to insure the expeditious and yet thorough welding of the joint between such juxtaposed edges. To the accomplishment of the foregoing and related ends the invention, then, consists of the steps and means hereinafter fully described and particularly pointed out in the claims.

The annexed drawings and the following description set forth in detail certain steps and mechanism embodying the invention, such disclosed means constituting, however, but several of the various ways in which the principle of the invention may be used.

In said annexed drawings:—

Figure 1 is a side elevational view, more or less diagrammatic in character, illustrating an apparatus adapted to weld together the edges of a metal tube in accordance with my improved method;

Fig. 2 is a similar view of a modified form of the apparatus;

Fig. 3 is an elevation of the same as viewed from the right in Fig. 2;

Fig. 4 is a plan view, with parts shown in section, illustrating yet another modification of the apparatus;

Fig. 5 is a side elevational view of such last-named modification; and

Fig. 6 is a cross-section showing the welding operation on a larger scale and with a further modification, or addition, in apparatus.

Any suitable feeding means for forcing or pulling the tube A through the welding apparatus proper may be employed, but one or more pairs of feed rolls 1, illustrated in Figs. 1 and 4 of the foregoing figures, are adapted for carrying out this part of the operation. By means of said feed rolls, the tube is drawn through between two pressure rolls 2 which are disposed so as to tend to force the butt edges of the tube more or less closely together. Disposed directly above these pressure rolls 2 is a suitable feeding device shown as consisting of two rolls 3 between which passes a continuous metallic electrode B of indefinite length, such electrode under operating conditions, being initially forced downwardly until it is in contact with the abutting edges of the tubing to be welded, then slightly withdrawn so as to form an arc, and being then maintained in such arcing distance.

In the first and simplest form of apparatus illustrated (Fig. 1), a hand wheel 4 is arranged to rotate a worm 5 that meshes with a worm wheel 6 on one of the rolls 3, and such wire electrode may be fed at any desired rate, to correspond with the rate of feed of the tube by properly rotating said hand wheel 4. The wire is conveniently coiled on a reel 7 or the like, from which it is drawn by the aforesaid feeding device and a guide 8 of refractory material may be utilized, if desired, to direct the wire to the proper point on the tubing.

Current may be supplied from any suitable source, as a generator 9, and is conveniently conducted to the tubing through the pressure rolls 2 and to the wire electrode through the feed rolls 3. Such current accordingly will pass from the electrode to the respective abutting edges of the tube, or vice versa, as the case may be, the arc formed between the two serving to heat such edges and the end of the electrode simultaneously. The current will be regulated to develop sufficient heat to gradually melt the electrode and as it thus melts the tubing will be advanced by means of the feed rolls so that such melted electrode will be disposed in the joint between the edges. The latter being simultaneously brought to a corresponding temperature, a continuously welded joint is formed which I have found can be made quite satisfactory for all purposes, and in fact superior to the ordinary butt-welded joint.

The metallic electrode being of an indefinite length, and means being provided as just described for continuously feeding the same onto the work, there need be no interruption in the operation during the handling of any particular piece or section of tubing. Uniformity of result is thus assured and a satisfactory speed can be obtained as well; while a material saving is effected in the amount of current consumed.

The modification illustrated in Figs. 2 and 3 consists in inter-gearing the feed rolls 3 for the electrode B with the pressure rolls 2, between which the tube A to be welded is passed. To this end, instead of the spindle with hand wheel 4 having a worm gear connection with the roll, I employ a vertically disposed spindle 10 connected with one of said feed rolls by gears 11 and provided at its upper end with a worm 12 that meshes with a worm-gear 13 on one such roll 3, the ratio of the gears 11, 12 and 13 being proportioned to feed the electrode at just the proper rate to correspond with the rate of feed of the work. It will be understood that the pressure rolls in this construction, as well as in the preceding one, are power driven.

The apparatus illustrated in Figs. 4 and 5 is further elaborated by the inclusion of means for automatically regulating the rate of feed of the wire electrode B to correspond with the progress of the welding operation. In addition to the feed rolls 1 and the pressure rolls 2 which are disposed substantially as before, there is provided in this last form of apparatus a solenoid 14 that is adapted to be actuated by the current flowing through the work and the wire electrode. This solenoid operates a bell-crank 15 which is, in turn, connected to throw in or out a double clutch 16, through which rotative movement is transmitted from a drive shaft 17, to a second shaft 18 that carries one of the feed rolls 3 for feeding the wire electrode. When such clutch is thrown to the right, the feed is direct and at a predetermined speed, while if the clutch is thrown to the left the feed is reversed so as to temporarily withdraw the electrode. In the intermediate position of the clutch, which is the one shown in Fig. 4, the feeding of the electrode will be simply interrupted and such electrode temporarily held stationary.

A spring 19, however, is so connected with the bell-crank 15 or other part of the automatic feeding device as to normally tend to throw the clutch into direct, or forward, feed. Accordingly, upon starting up the apparatus, assuming the current to be on, (the circuit connections being controlled by a switch 20), if the shaft 17 is started rotating, the electrode will be fed forwardly until its end actually contacts with the juxtaposed edges of the tube A, thereby completing the circuit and causing such a flow of current as will actuate the solenoid to throw the clutch into reverse. The reversing of the feed will withdraw the electrode a trifle, just sufficient, in fact, to remove the end of the electrode the proper distance from said edges to establish an arc. With such arc established the flow of current from the circuit, although reduced, will still permit the clutch to drive the feed rolls forwardly and thus continuously feed the electrode at a rate capable of maintaining its end within such arcing distance, despite the gradual fusing of the end. The work being progressively advanced past the end of the electrode, the juxtaposed edges are brought substantially to a point of fusion, as the melted material from the electrode is deposited between the same.

Should the electrode be fed too rapidly, so as to again bring the same into actual contact with the work, the solenoid will be actuated by the increased flow of current to interrupt the feeding operation, or oven to reverse the same. As soon, however, as the distance of the electrode from the work is restored to normal, the clutch is thrown into the forward feeding position and the operation proceeded with. The operation of the solenoid may be very sensitive so that a very exact control of the feeding operation is secured, the wire electrode being advanced at just the proper speed to give the desired welding effect. The tension of spring 19 may be adjusted by means of a nut 22.

In rolling up the sheet or strip of metal to preliminarily form the tube for use in the ordinary butt-welding operation, it is usual to stretch the outer surface of the sheet so that the juxtaposed edges may lie in substantially the same radial plane with respect to the axis of the tube. For use in the present improved process, however, it is not necessary to do this, and in fact it is preferable that the edges *a* be left in their normal state so that they flare a trifle and thus form a sort of trough, as illustrated in somewhat exaggerated fashion in Fig. 6. In other words, the extreme inner portion of the meeting faces will come into closer contact than the outer portion of such faces, and the fused metal 3 that is deposited from the electrode will thus be held more closely between such edges and not fall through into the interior of the tube. This latter result may be still further assured by supporting within the tube a short mandrel 21 of porcelain or other refractory material so as to form a complete closure for the space between such juxtaposed edges.

The arrangement just referred to is also illustrated in said Fig. 6, it being considered unnecessary to illustrate the means of supporting the mandrel as these may be readily improvised, and will vary depending upon whether the tube is preliminarily rolled up in sections of considerable length, or is continuously rolled up, as the welding operation progresses, from a long strip of metal as it comes from the skelping rolls.

Suitable insulation will of course be provided in each of the several forms of apparatus described above, so as to prevent the current from straying. The particular disposition of such insulation, however, is obviously a matter of indifference and no attempt has been made to show the same in detail in the drawings.

While the several foregoing described forms of apparatus for use in my improved method are illustrated as adapted for welding the edges of tubing together, it will be understood that the apparatus may be equally well utilized for welding together the juxtaposed edges of separate sheets or other articles. Accordingly for the purpose of this specification and the following claims, the respective edge portions of the tube may be regarded simply as two metallic articles, although they form part of the same tube. My improved process, however, does find a highly advantageous field of use in the manufacture of tubing, since by means of it tubing of indefinite length can be made from a strip or skelp, being fed through the welding apparatus, while a metallic electrode, of like indefinite length is progressively brought into proximity with the contacting or substantially contacting edges of the tube. The current, it will be observed, by reason of the circuit connections employed, is passed through such edges of the tube and the electrode.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. In apparatus for electrically welding tubing, the combination of pressure rolls adapted to maintain the edges of a preliminarily formed tube in substantial contact; means adapted to feed a metallic electrode transversely of such tube toward such edges; means adapted to feed such tube longitudinally so as to move such edges progressively past the end of said electrode; circuit connections for passing a fusing electric current through said electrode to both such edges; a suitable driver; a clutch for operatively connecting said electrode feeding means with said driver; and electro-magnetic means connected in such circuit and adapted to operate said clutch.

2. In apparatus for electrically welding tubing, the combination of pressure rolls adapted to maintain the edges of a preliminarily formed tube in substantial contact; means adapted to feed a metallic electrode transversely of such tube toward such edges; means adapted to feed such tube longitudinally so as to move such edges progressively past the end of said electrode; circuit connections for passing a fusing electric current through said electrode to both such edges; a suitable driver; a clutch adapted optionally to connect said electrode feeding means directly or reversely with said driver; and electro-magnetic means connected in such circuit and adapted to operate said clutch.

3. In apparatus for continuous electric welding, the combination of means for feeding the work; means for maintaining the edges to be welded together in substantial contact; rotary means adapted to grip a fusible metallic electrode and feed same transversely of the line of feeding movement of the work; circuit connections for passing a fusing current through said electrode to such edges; and rotary means controlled by the fusing current for automatically regulating the relative feeding movements of said electrode and the work.

4. In apparatus for electrically welding tubing, the combination of means for maintaining the edges of a preliminarily formed tube in substantial contact; rotary means adapted to grip a metallic electrode and feed same transversely of such tube; means adapted to feed the tube longitudinally so as to move such edges progressively past the end of said electrode; circuit connections for passing a fusing current through such electrode to such edges; and rotary means automatically controlled by the fusing current in said circuit, for actuating said rotary feeding means.

5. In apparatus for continuous electric welding, the combination of means for feeding the work; means for maintaining the edges to be welded together in substantial contact; means adapted to grip a fusible metallic electrode and feed same transversely of the line of feeding movement of the work; circuit connections for passing a fusing current through said electrode to such edges; and rotary means governed by the fusing current to automatically control said electrode feeding means so that the rate of feeding of said electrode will be in accordance with the variations in the fusing current.

6. In apparatus for continuous electric arc welding, a fusible metallic electrode, means to grip said electrode and feed the same toward the work to be welded, circuit connections for passing a fusing electric current through said electrode to the work, and devices governed by the fusing current to start the arc and to automatically control said electrode feeding means so that the rate of feeding of said electrode will be in accordance with the variations in the fusing current.

Signed by me this 3d day of May, 1919.

FRANK L. SESSIONS.